United States Patent [19]

Hatch

[11] 4,207,486

[45] Jun. 10, 1980

[54] METHOD AND APPARATUS FOR LIQUID METAL CIRCULATION IN AN ACYCLIC MACHINE

[75] Inventor: Burton D. Hatch, Ballston Lake, N.Y.

[73] Assignee: General Electric Company, Schenectady, N.Y.

[21] Appl. No.: 924,055

[22] Filed: Jul. 12, 1978

[51] Int. Cl.² ............................................. H02K 31/00
[52] U.S. Cl. ................................... 310/178; 310/114; 310/127; 310/219
[58] Field of Search .............. 310/178, 127, 219, 112, 310/248, 114, 249–251; 322/48

[56] References Cited

U.S. PATENT DOCUMENTS

| | | | |
|---|---|---|---|
| 3,585,398 | 6/1971 | Harvey | 310/178 |
| 3,705,995 | 12/1972 | Chabrerie | 310/178 |
| 3,743,874 | 7/1973 | Chabrerie | 310/178 |
| 3,916,235 | 10/1975 | Massar | 310/178 |

FOREIGN PATENT DOCUMENTS 1266621  3/1972  United Kingdom ..................... 310/178

*Primary Examiner*—R. Skudy
*Attorney, Agent, or Firm*—Nathan D. Herkamp; James C. Davis, Jr.; Paul R. Webb, II

[57] ABSTRACT

A constant supply of liquid metal for current collectors in a disk-type acyclic machine is provided by passageways through each stator disk extending from the region adjacent a radially-outer collector to the region adjacent a radially-inner collector. Dynamic pumping of the liquid metal in the region adjacent the outer current collectors is provided by the rotational motion of the rotor disks and by Lorentz expulsion forces acting upon the liquid metal. The openings to said passageways in the region of the outer current collectors are configured to catch a portion of the liquid metal moving with the radially-outer edge of the rotor disks and thereby apply the dynamic pressure of this portion of the liquid metal to move the liquid metal radially-inwardly. Return flow is accommodated by flow paths in the stator separate from those provided for inward flow.

8 Claims, 4 Drawing Figures

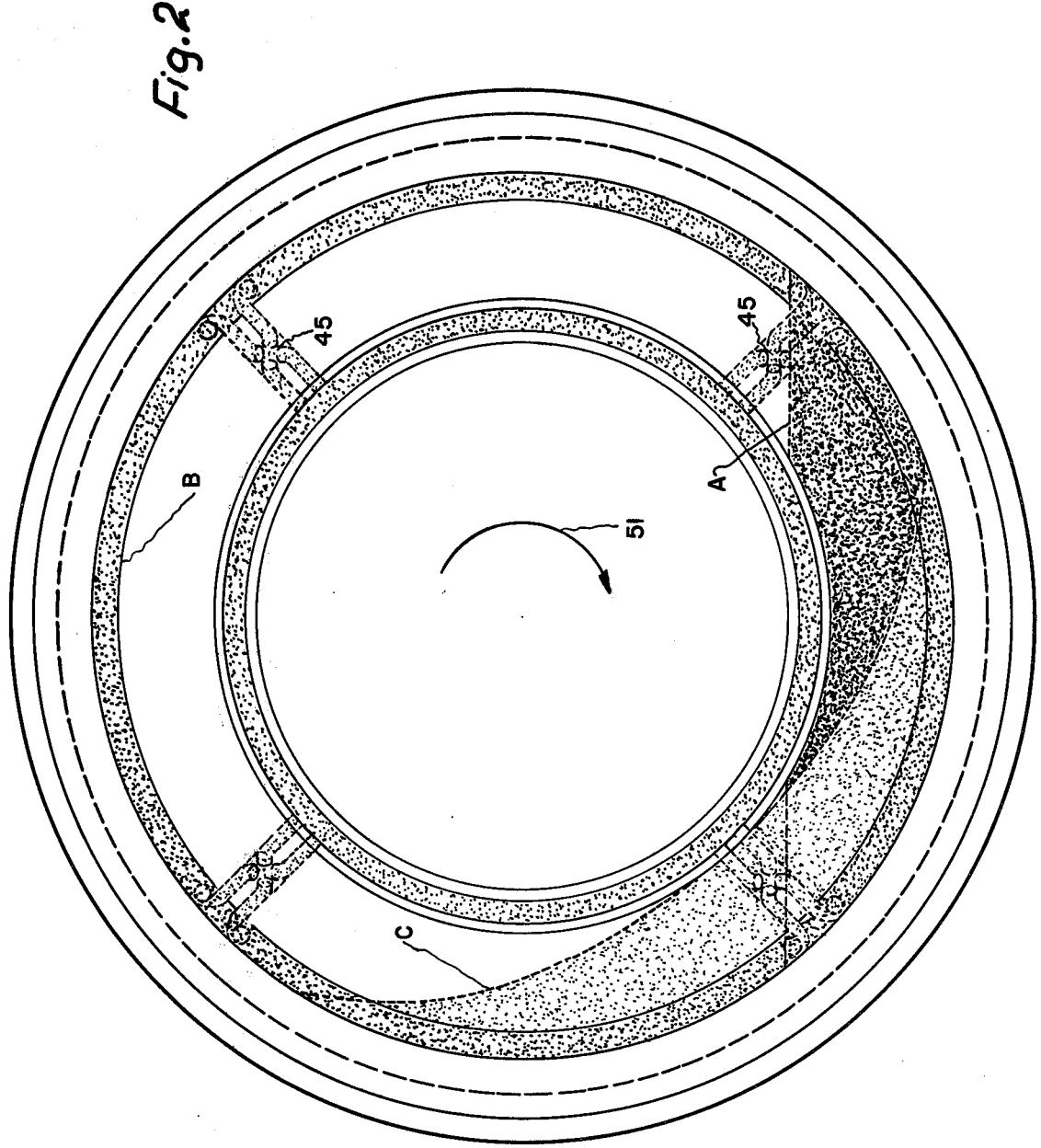

METHOD AND APPARATUS FOR LIQUID METAL CIRCULATION IN AN ACYCLIC MACHINE

BACKGROUND OF THE INVENTION

This invention relates to acyclic machines, and more particularly to such machines utilizing a plurality of interleaved rotor disks and stator disks connected in series by liquid metal current collectors providing electrical connection between adjacent rotor and stator disks. This may be a machine of the disk type or of the disk/drum type, the latter being disclosed in U.S. patent application Ser. No. 898,923, filed Apr. 21, 1978, by the instant applicant and assigned to the assignee of the instant application; the disclosure of which is incorporated herein by reference.

In high current, high speed operation of acyclic machines, it is necessary to provide a constant high current capacity contact between rotor and stator disks. In machines using liquid metal current collectors, this requires a constant supply of liquid metal to current collectors in order to continuously wet the contact surfaces between rotor and stator disks. At high speeds of operation, the centrifugal force and Lorentz expulsion forces tend to drive the liquid metal from the inner current collectors. This would result in their operating dry, which would provide an inadequate current carrying capacity for high current density machines, and, therefore, result in severe damage to the current carrying contact surfaces on the current collectors.

Liquid metal circulation means and methods are known in the prior art for circulating metal around a current collector ring. Such a method is disclosed in U.S. Pat. No. 4,027,183 of the instant inventor, issued May 31, 1977 and assigned to the assignee of the instant application. Also in the prior art is a liquid metal current collector of the type disclosed in U.S. Pat. No. 4,027,184, issued May 31, 1977 to Hurley and assigned to the assignee of the instant application. These disclosures are drawn to localized circulation of liquid metal around a single current collector, and require a large quantity of liquid metal within the gap between the stator and the rotor. The large quantity of liquid metal causes large viscous losses due to frictional contact between the rotating rotor surfaces and the liquid metal.

Also known in the prior art is the liquid metal distribution system as disclosed in U.S. Pat. No. 3,211,936, issued Oct. 12, 1965 to Harvey. This patent discloses an external pumping supply system to provide liquid metal to the current collectors. This provided only for liquid metal supply through passages provided external to the apparatus.

Also in the prior art is U.S. Pat. No. 3,989,969, issued Nov. 2, 1976 to the instant applicant and assigned to the instant assignee. That patent discloses a method of liquid metal circulation around an intermediate current collector to provide continuous liquid metal contact between the stator and rotor collector rings, making use of the Lorentz expulsion force to drive the circulation of the liquid metal. This provides only circulation in the vicinity of a single collector ring.

None of the prior art patents discloses a means for or a method of circulating liquid metal entirely through the stator disks. The circulation paths provided by the prior art relied upon external equipment, or provided only localized circulation around a single collector ring.

The primary object of the instant invention is to provide an automatic and reliable supply of liquid metal from the region adjacent an outer current collector of an acyclic machine to the region adjacent an inner current collector at all speeds of operation in both directions of rotation. A second object is to accomplish this supply of liquid metal while employing a minimum quantity of the liquid metal in each current collector site, so as to reduce to a minimum the viscous drag losses of operation at high rotational speed.

DESCRIPTION OF THE INVENTION

The invention of the instant application achieves the above objectives by utilizing the pressure head created by rotation of the rotor disks in frictional contact with the liquid metal in radially-outer current collectors to pump liquid metal radially-inwardly toward radially-inner current collectors. A method and apparatus is disclosed for the constant completely internal supply of conductive liquid metal between axially adjacent, radially separated current collectors in an acyclic machine to ensure constant adequate current carrying capacity in the current collectors in all modes of operation. The liquid metal in the outer current collector is accelerated by frictional contact with the rotating rotor. The kinetic energy is used by the instant invention to provide a pressure head to pump the liquid metal from the radially-outer current collectors to the radially-inner current collectors. This produces continual supply of liquid metal for the wetting of the electrical contact surfaces between the rotor and stator disks.

In a preferred embodiment disclosed herein, a spiral groove plug is provided with an opening providing a scoop to catch a portion of the liquid metal which is connected through a spiral groove passage to a radially-extending passage in a stator disk to provide a complete radial flow path. A pair of such flow paths provides a complete circulation path for liquid metal.

BRIEF DESCRIPTION OF THE DRAWINGS

The features of the invention believed to be novel and unobvious over the prior art are set forth with particularity in the appended claims. The invention itself, however, as to organization, method of operation, and objects and advantages thereof, may best be understood by reference to the following description taken in conjunction with the accompanying drawings wherein:

FIG. 2 is a schematic cross-sectional view through a complete machine of the type shown in FIG. 1;

MANNER AND PROCESS OF MAKING AND USING THE INVENTION

The particular machine shown in FIGS. 1 through 4 and described herein is merely exemplary, and the scope of the invention is defined in the claims.

Figure 1:
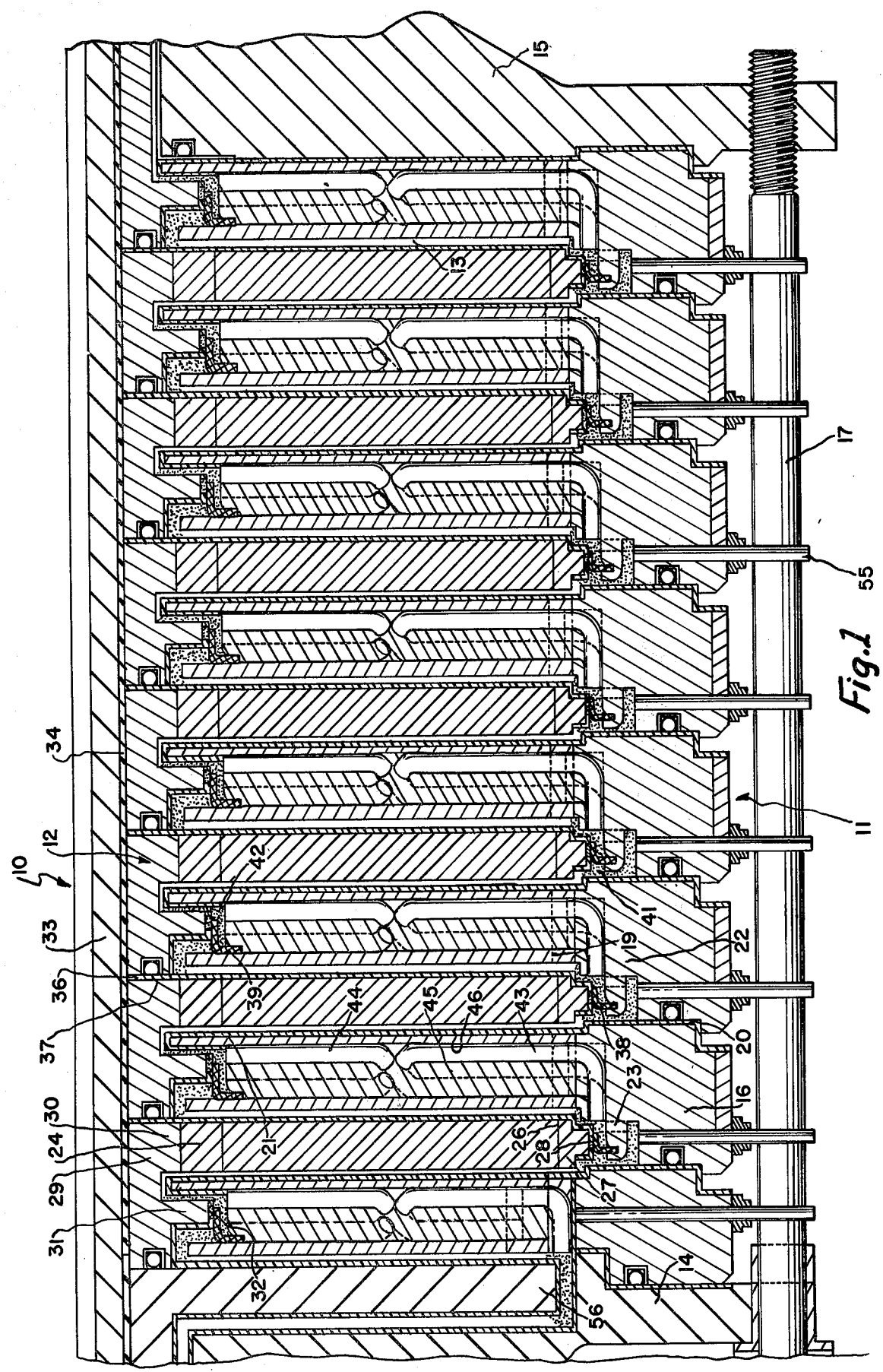
FIG. 1 is an enlarged sectional view schematically illustrating one section of a machine of the type utilizing the invention disclosed herein.

The machine partially shown in FIG. 1 is an acyclic machine of the type disclosed in U.S. patent application Ser. No. 898,923, filed Apr. 21, 1978 by the instant applicant and assigned to the instant assignee, said application being incorporated herein by reference. Such machines utilize high current density field coils, such as superconducting field coils, to provide a high density magnetic field. This provides a high output torque when operating as a motor and a high output current when operating as a generator. Due to the required high current carrying capacity of such machines, liquid metal current collectors are required to make connections between adjacent disks.

The instant invention provides a constant supply of highly electrically conductive liquid metal to the current collectors to ensure adequate current carrying capacity for high current density machines. This is accomplished with a minimum quantity of liquid metal, thereby reducing to a minimum the viscous drag on the rotor. By reducing viscous drag, the losses of machine efficiency are minimized.

A disk machine 10 as illustrated in FIG. 1 herein comprises a stator 11 and a rotatable rotor 12 separated by a gap 13. Bearings (not shown) are provided to maintain the gap 13 between the stator 11 and the rotor 12 to ensure adequate mechanical clearance and, in the instant invention, to provide space for liquid metal between the rotor 12 and stator 11.

The stator 11 comprises shielding sections 14 and 15 and a stack of conductive stator collector rings 16 held together by appropriate means such as the bolt 17 arrangement shown in FIG. 1. Attached to each of the stator collector rings 16 is a stator disk 19. The stator disks 19 are made of conductive material, usually copper and its alloys or iron or iron alloys. Adjacent stator collector rings 16 are insulated from each other by a layer 20, shown greatly enlarged, of an appropriate insulating material, such as alumina. The layer 20 of insulating material extends along one side 21 of each stator disk 19 to prevent shorting between adjacent stator and rotor disks. The stator collector rings 16 as shown in FIG. 1 provide a disk mounting portion 22 for attachment of the stator disks 19 and an axial extension 23 which surrounds an adjacent rotor disk 24.

The rotor 12 comprises a plurality of rotor disks 24, usually made of copper, copper alloy, iron or an alloy of iron, interleaved with said plurality of stator disks 19. Surrounding and attached to the radially-outer surface 26 of each rotor disk 24 is a conductive rotor collector ring 27 having a narrow annular contact area 28 for making electrical contact with a juxtaposed stator collector ring 16. The contact area 28 could be partially or entirely filled by an extension of rotor collector ring 27. The rotor disks 24 are mounted on conductive mounting rings 29 having a mounting portion 30 for attachment of the rotor disks 24 and an axial extension 31 having a narrow annular contact surface 12 for making electrical contact with an adjacent, juxtaposed stator disk 19. The rings 29 are attached to a hollow rotatable shaft 33 by keys in an appropriate keyway or other suitable connection means. The rings 29 are separated by a layer 36, shown greatly enlarged, of insulating material, such as alumina. The layer 36 of insulating material extends along one side 37 of each rotor disk 24. The layers 20 and 36 of insulating material, together with such a layer 34 of insulation on the surface of the hollow shaft 33, prevent electrical shorting between adjacent rotor disks 24 and stator disks 19.

Figure 3:
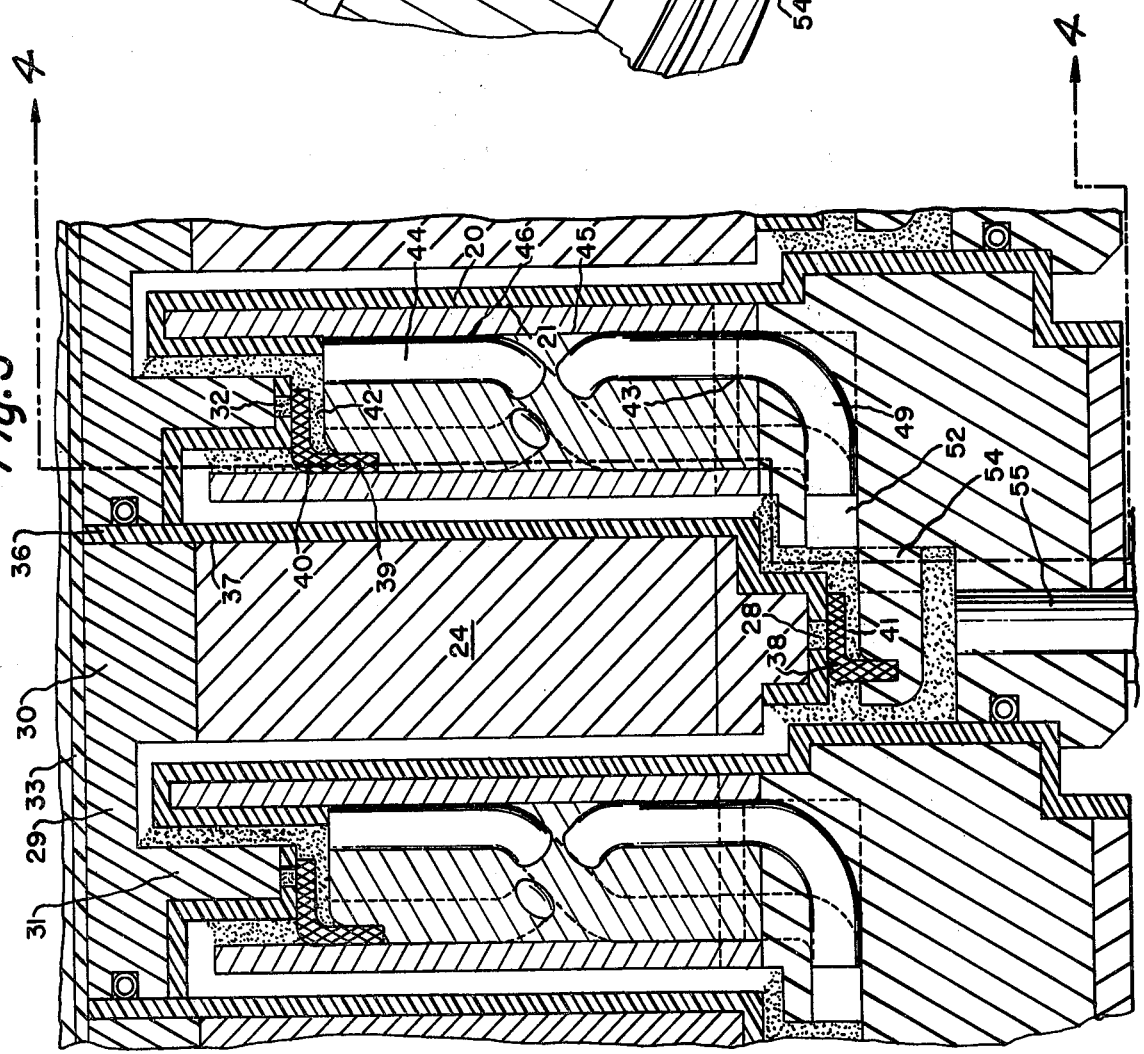
FIG. 3 is an enlarged cross-sectional view through one pair of radial fluid passages in a stator disk.

As shown in FIG. 3, attached to the extension 23 of each stator current collector ring 16 is a conductive compliant metal filament brush 38. Each stator disk 19 has attached in a groove 39 in the radially-inner surface thereof a conductive compliant metal filament brush 40. These brushes 38 and 40 could be of the type disclosed in U.S. patent application Ser. No. 876,570, filed Feb. 10, 1978 by the instant applicant, or of the type shown in U.S. patent application Ser. No. 878,786, filed Feb. 17, 1978 by Marshall, both assigned to the assignee of the instant application, and both of the applications incorporated herein by reference.

The brush 38 is held by the resilience of the compliant metal filaments in close proximity with the narrow annular contact area 28 on the rotor collector ring 27 to form a current collector 41. As also shown in FIG. 3, the conductive compliant metal filament brush 40 is held by the resilience of the compliant metal filaments in close proximity with annular contact area 32 formed on axial extension 31 to form a current collector 42. Each of the compliant conductive metal filament brushes 38 and 40 and the annular contact surfaces 28 and 32, respectively, provide a complete circumferential contact area between adjacent rotor disks 24 and stator disks 19. The combination of rotor disks 24, stator disks 19 and current collectors 41 and 42 provide a single current path through the machine as described in the aforementioned U.S. patent application Ser. No. 898,923.

In order to provide adequate current carrying capacity for high current density machines, such as a machine utilizing superconducting or supercooled copper or aluminum field coils as disclosed in the aforementioned U.S. patent application Ser. No. 898,923, highly electrically conductive liquid metal is required between each compliant conductive metal filament brush and its associated annular contact ring to complete the current collector structure. The liquid metal may be mercury or a sodium-potassium alloy or other appropriate highly electrically conductive metal which is liquid at the operating temperature range of the machine.

In the apparatus of the instant invention, at least one pair of radial passages 43 and 44, is provided in each stator disk 19 for circulation of liquid metal from one of said current collectors 41 to one of said current collectors 42, both adjacent the same stator disk, and from said current collector 42 to said current collector 41 regardless of the direction of rotation. In the preferred embodiment shown in FIGS. 1 and 3, passages 43 and 44 are shown as grooves in the surface of a cylindrical insert 45 fastened within a hole 46 in the stator disk 19. The inserts 45 could be of cross-sectional shapes other than circular, but the machining of the passages into the inserts would be more difficult. The passages 43 and 44 could, alternatively, by passages cut within the stator disk 19 itself at separate locations around the stator disk 19. As shown in FIG. 2, a plurality of inserts 45 each containing a pair of passages 43 and 44 may be inserted within each stator disk 19. Any number of inserts 45 as required to provide the necessary liquid metal circulation could be provided in circumferentially spaced locations.

Figure 4:
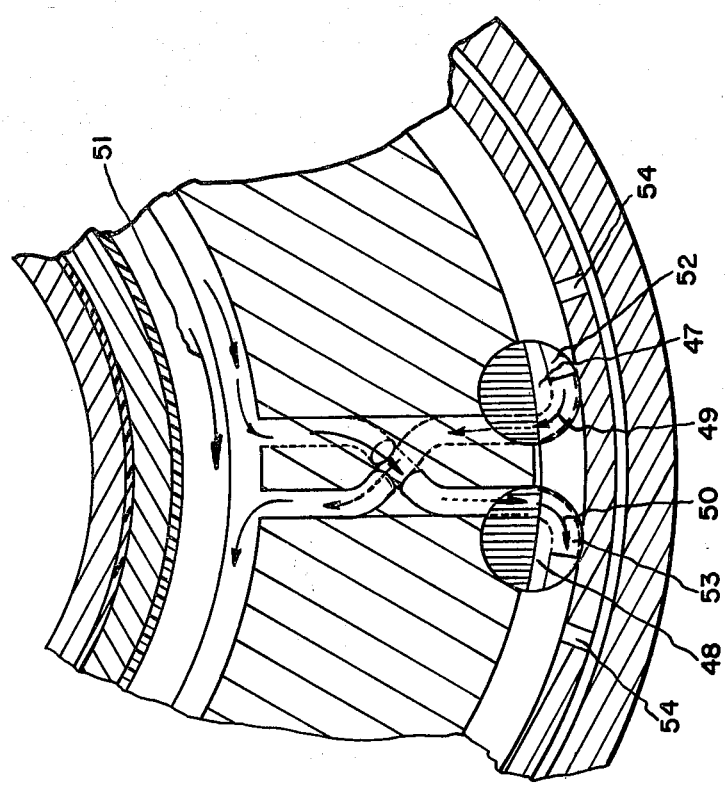
FIG. 4 is a cross-sectional view taken along line 4—4 of FIG. 3.

As shown in FIG. 4, a pair of spiral groove plugs 47 and 48 provide inlet and outlet passages 49 and 50 for liquid metal in the region of the current collector 41. The spiral groove plugs 47 and 48 could be of any cross-sectional shape, but a circular shape provides the most convenient shape for machining of the spiral grooves. The spiral groove plugs 47 and 48 are shown in FIGS. 2 and 4 to be positioned as pairs in contact with an insert 45. The spiral groove plugs could alternatively be located separately to provide inlet and outlet for separately-located radial passages. Each spiral groove and connected radial passage form a flow path connecting radially-outer and radially-inner current collectors.

Passage 49 in spiral groove plug 47 extends from the radially-outer end of the radial passage 43 to an opening in the region of current collector 41, whereby, for a given sense of rotation as shown by arrow 51, FIG. 4, flow communication exists for the movement of liquid metal into passage 49 adjacent current collector 41 and through passages 49 and 43 to exit adjacent current collector 42. Passage 50 in spiral groove plug 48 extends from the radially-outer end of the radial passage 44 to an opening in the region of current collector 42, whereby, for the same given sense of rotation as described above, flow communication exists for the movement of liquid metal from the region adjacent current collector 42 through passages 44 and 50 to exit adjacent current collector 41. For the rotation in the reverse sense, the directions of flow are reversed.

The liquid metal is pumped by rotation of the rotor disks in the direction shown by arrow 51. A portion of the liquid metal is caught by the opening 52 to the passage 49 in spiral plug 47, in the region of the first current collector. The cross-sectional area of the spiral grooves 49 and 50 may remain constant or increase in the direction away from the opening 52 and 53. As the liquid metal enters a spiral groove its velocity is reduced, and some of its kinetic energy is converted into static pressure. The static pressure head drives the liquid metal through passage 49 and the radial passageway 43 to the second current collector 42, and by centrifugal force, liquid metal is returned to the first current collector through second radial passageway 44, passage 50 in spiral plug 48 and out at the region adjacent current collector 41.

As shown in FIG. 2, the line A represents the surface of the liquid metal at zero speed. In addition to this liquid metal, additional liquid metal remains in the interstices of the compliant filament brushes to provide contact at start-up. The distribution of liquid metal at high speed is shown by the line B. As also shown in FIG. 2, the line C represents the liquid metal surface at moderate clockwise rotational speed.

Because of the circulation capability of this invention, a lesser amount of liquid metal need be included in the gap 13 relative to batch filled, self-contained prior art machines, and as a result, the viscous drag and resultant losses of efficiency are kept to a minimum. In one prior art technique of operating with the machine fully flooded, i.e., with adequate liquid metal to wet the radially-inner current collectors in high speed operation, substantially greater viscous drag is applied to the rotating rotor by the liquid metal, which contacts a substantially greater surface area in a fully flooded machine than in the machine of the instant invention. This is a significant consideration in machine efficiency, especially at high speeds of rotation.

In one construction of the machine, local circulation of the liquid metal is provided by Lorentz expulsion forces. The high current flowing through the current collectors acts to apply an electromagnetic force upon the conductive liquid metal. This force ejects the liquid metal from the brush-contact ring interface and causes local circulation of the liquid metal in the region of each current collector. In the radially-outer current collectors a plurality of holes 54 facilitates circulation. The electromagnetic force imparts kinetic energy to the liquid metal which increases its velocity. Thereby, energy in addition to that due to the rotation of the rotor is available for conversion to pressure in the spiral groove passages. The liquid metal may be drained from the machine through drains 55.

As shown in FIGS. 1 and 3, at the end of the rotor is a disk 56 not connected to the electrical circuit, but which provides the requisite pumping of the liquid metal from gap 13 to the region of the first radially-inner current collector. This is necessary in order to continuously supply liquid metal to that current collector, as explained in the aforementioned U.S. patent application Ser. No. 898,923.

When the machine is operating in the clockwise direction of rotation as shown by arrow 51, the liquid metal follows the path illustrated in FIG. 4 at each pair of flow paths. Liquid metal enters the openings 52 to spiral grooves 49 in the region of current collectors 41. Kinetic energy is converted to static pressure within spiral grooves 49, and liquid metal is thereby pumped through radial passages 43 to exit in the region of current collectors 42. The compliant brushes 40 are thereby immersed in the liquid metal. By electromagnetic forces the liquid metal is ejected from the interfaces between brushes 40 and contact surfaces 32. A portion of the liquid metal flows into the radially-extending passages 44 through spiral grooves 50 and exits through openings 53 into the regions adjacent current collectors 41. In the counterclockwise direction of rotation all of the flow directions are in the opposite sense. Thereby, the instant invention provides for reversibility in high current density machines without any reduction in current carrying capacity.

BEST MODE

The best mode contemplates utilizing sodium-potassium alloy as liquid metal since sodium-potassium is liquid over a wide range of temperature and is an excellent conductor of electrical current.

The best mode also contemplates use of a plurality of pairs of flow passages to ensure adequate liquid metal coverage to the current collectors. Each pair of flow paths incorporates a pair of spiral groove plugs positioned within holes in a disk mounting portion 22 of a stator collector ring 16, so that each pair of spiral grooves connects with a pair of radially-extending passages in an insert 45 so that a radially-inward and radially-outward flow are provided through one passage of each insert 45.

While preferred features and the best mode of the invention have been shown, many modifications and changes will occur to those skilled in the art. It is, therefore, to be understood that the appended claims are intended to cover all such modifications and changes as fall within the true scope of the invention.

I claim:

1. In an acyclic electrodynamic machine having; a hollow shaft mounted for rotation about an axis; a plurality of annularly-shaped electrically conductive rotor disks each mounted concentrically with said shaft and connected thereto by an electrically conductive rotor disk mounting ring; a first electrically conductive rotor collector ring surrounding and attached to the outer circumferential surface of each of said rotor disks; a plurality of annularly-shaped electrically conductive stator disks interleaved with said rotor disks; each of said stator disks being mounted concentrically within one of a plurality of electrically conductive stator mounting rings; each of said stator mounting rings having an annular stator collector ring formed thereon and disposed circumferentially around one of said first rotor collector rings; each of said rotor disk mounting rings having an annularly-shaped portion extending in the axial direction radially-inward of a stator disk, and constituting a second rotor collector ring; a plurality of first conductive compliant metal filament brushes attached, respectively, to the inner circumferential surface of each of said stator collector rings; each of said first brushes surrounding and being in close proximity to a first rotor collector ring and forming a first brush/first rotor collector ring combination therewith; each said first brush/first rotor collector ring combination comprising a first current collector; a plurality of second conductive compliant metal filament brushes attached, respectively, to the inner circumferential surface of each of said stator disks; each of said second brushes surrounding and being in close proximity to one of said second rotor collector rings, respectively, and forming a second brush/second rotor collector ring combination therewith; each said second brush/second rotor collector ring combination comprising a second current collector; each of said current collectors being completed by conductive liquid metal disposed between the brush and rotor collector ring portions thereof; the improvement comprising:

at least one pair of circulation paths disposed internally of each of said stator disks for the transport of liquid metal from a given first current collector to a given second current collector through one of said pair of circulation paths and from said given second current collector to said given first current collector through the other of said pair of circulation paths.

2. The apparatus of claim 1, wherein each pair of flow paths comprises a pair of passages in the surface of a cylindrical insert mounted in a radially-extending bore in a stator disk, and a spiral groove passage in flow communication at one end thereof with one end of each of said passages, the other end of said spiral groove passage being in flow communication with the region of a first current collector, and the other end of each of said pair of passages being in flow communication with the region of a second current collector.

3. The apparatus of claim 2, wherein the end of the spiral groove in flow communication with the region of a first current collector defines a scoop configured to catch a portion of the liquid metal circulating circumferentially with said rotor disks when said machine is operating.

4. The apparatus of claim 2, wherein each of the spiral groove passages is provided by a spiral groove cut in the surface of a spiral groove plug mounted in a hole in the stator collector ring.

5. The apparatus of claim 1, wherein the improvement further comprises four said pairs of circulation paths uniformly circumferentially spaced within each of said stator disks.

6. The apparatus of claim 1, wherein the liquid metal comprises a sodium-potassium alloy.

7. A method of continually supplying conductive liquid metal to liquid metal current collectors in an acyclic disk machine comprising:

imparting kinetic energy to liquid metal in the liquid metal current collectors by contact of said liquid metal with a rotating rotor causing movement of said liquid metal with said rotor;

catching a portion of said moving liquid metal in a first passage shaped to convert said kinetic energy of said portion into static pressure to pump said portion of said liquid metal via a first passage in a stator disk of said machine from a region adjacent a first current collector to a region adjacent a second current collector radially-inward of said first current collector; and passing liquid metal through a second passage in said stator disk from the region adjacent said second current collector to the region adjacent said first current collector.

8. The method of claim 7, further comprising imparting kinetic energy to said liquid metal in the regions adjacent said current collectors by electromagnetic interaction between said conductive liquid metal and current flowing through said current collectors when said machine is operating.

* * * * *